US008944910B1

(12) United States Patent
Boyle

(10) Patent No.: US 8,944,910 B1
(45) Date of Patent: *Feb. 3, 2015

(54) METHOD AND SYSTEM FOR SECURE PLAY IN A MOBILE VIRTUAL CASINO

(71) Applicant: Joingo, LLC, San Jose, CA (US)

(72) Inventor: Stephen S. Boyle, Lincoln, CA (US)

(73) Assignee: Joingo, LLC, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/789,686

(22) Filed: Mar. 8, 2013

Related U.S. Application Data

(60) Provisional application No. 61/720,398, filed on Oct. 31, 2012.

(51) Int. Cl.
*A63F 13/12* (2006.01)
*A63F 13/30* (2014.01)

(52) U.S. Cl.
CPC .................................... *A63F 13/12* (2013.01)
USPC .................... 463/29; 463/25; 463/26; 463/30

(58) Field of Classification Search
USPC ........................................ 463/25, 26, 29, 30
See application file for complete search history.

(56) References Cited

U.S. PATENT DOCUMENTS

| | | | | |
|---|---|---|---|---|
| 8,172,687 | B2 | 5/2012 | Gagner et al. | |
| 8,221,241 | B2 | 7/2012 | Davis et al. | |
| 8,255,297 | B2 | 8/2012 | Morgenstern et al. | |
| 8,771,063 | B1 * | 7/2014 | Boyle | 463/29 |
| 2007/0202941 | A1 | 8/2007 | Miltenberger et al. | |
| 2008/0274802 | A1 | 11/2008 | Joao | |
| 2009/0098925 | A1 | 4/2009 | Gagner et al. | |
| 2009/0247285 | A1 * | 10/2009 | Gagner | 463/25 |
| 2010/0093429 | A1 * | 4/2010 | Mattice et al. | 463/25 |
| 2010/0227675 | A1 | 9/2010 | Luxton et al. | |
| 2011/0300917 | A1 * | 12/2011 | Hill | 463/11 |
| 2012/0149463 | A1 | 6/2012 | Jabara et al. | |
| 2012/0202601 | A1 * | 8/2012 | Gagner et al. | 463/42 |
| 2012/0323683 | A1 | 12/2012 | Feldman et al. | |

* cited by examiner

*Primary Examiner* — Dmitry Suhol
*Assistant Examiner* — Brandon Gray
(74) *Attorney, Agent, or Firm* — Clause Eight IPS; Michael Catania

(57) ABSTRACT

A method and system for management of a virtual casino game in which the game logic resides on a server is disclosed herein. The system is comprised of a mobile device, a native application for a virtual casino residing on the mobile device, a game server, and a player accounts database. The game logic is segmented from the casino game and resides on the game server to prevent fraud.

7 Claims, 7 Drawing Sheets

METHOD AND SYSTEM FOR SECURE PLAY IN A MOBILE VIRTUAL CASINO

CROSS REFERENCES TO RELATED APPLICATIONS

The present application claims priority to U.S. Provisional Patent Application No. 61/720,398, filed on Oct. 31, 2012, which is hereby incorporated by reference in its entirety.

STATEMENT REGARDING FEDERALLY SPONSORED RESEARCH OR DEVELOPMENT

Not Applicable

BACKGROUND OF THE INVENTION

1. Field of the Invention

The present invention generally relates to mobile virtual casinos. More specifically, the present invention relates to a method and system for secure play in a mobile virtual casino on a mobile communication device.

2. Description of the Related Art

Recently gambling authorities have begun to permit gambling on mobile phones. However, there is a need to verify that the gambler is within a gambling authority's jurisdiction. Further, there is a need to prevent fraud on the virtual casino.

General definitions for terms utilized in the pertinent art are set forth below.

APP is a software application for a mobile phone such as a smart phone.

Application Programming Interface (API) is a collection of computer software code, usually a set of class definitions, that can perform a set of related complex tasks, but has a limited set of controls that may be manipulated by other software-code entities. The set of controls is deliberately limited for the sake of clarity and ease of use, so that programmers do not have to work with the detail contained within the given API itself.

BLUETOOTH technology is a standard short range radio link that operates in the unlicensed 2.4 gigaHertz band.

Code Division Multiple Access ("CDMA") is a spread spectrum communication system used in second generation and third generation cellular networks, and is described in U.S. Pat. No. 4,901,307.

CRM (Customer Relationship Management) is a widely-implemented strategy for managing a company's interactions with customers, clients and sales prospects. CRM involves using technology to organize, automate, and synchronize business processes and the like—principally sales activities, but also business processes and the like for marketing, customer service and technical support.

Direct Inward Dialing ("DID") involves a carrier providing one or more trunk lines to a customer for connection to the customer's private branch exchange ("PBX") and a range of telephone lines are allocated to this line.

FTP or File Transfer Protocol is a protocol for moving files over the Internet from one computer to another.

GSM, Global System for Mobile Communications is a second generation digital cellular network.

Hypertext Transfer Protocol ("HTTP") is a set of conventions for controlling the transfer of information via the Internet from a web server computer to a client computer, and also from a client computer to a web server, and Hypertext Transfer Protocol Secure ("HTTPS") is a communications protocol for secure communication via a network from a web server computer to a client computer, and also from a client computer to a web server by at a minimum verifying the authenticity of a web site.

Internet is the worldwide, decentralized totality of server computers and data-transmission paths which can supply information to a connected and browser-equipped client computer, and can receive and forward information entered from the client computer.

Interactive voice response ("IVR") is a telephone technology in which a user uses a phone to interact with a database to acquire information.

Long Term Evolution ("LTE") is a next generation communication network.

Multimedia messaging service ("MMS") communication is a communication transmitted to and from a mobile phone that includes a multimedia content such as a digital photograph (JPEG), videos, and the like.

Mobile Originated ("MO") is a text message that is sent from a mobile phone.

Mobile Terminated ("MT") is a text message that is sent to a mobile phone.

Public Switch Telephone Network ("PSTN") is a telecommunication system in which networks are inter-connected to allow telephones to communicate with each other throughout the world.

Short Message Service ("SMS") is text messaging communication using a mobile phone or other device to send messages up to 160 characters in length.

Short message peer-to-peer ("SMPP") is a telecommunications protocol for exchanging SMS messages between SMS peer entities.

Simple object access protocol ("SOAP") is a computer network protocol for exchanging information.

Simple mail transfer protocol ("SMTP") is a delivery protocol for email.

A SMS aggregator is an entity that provides connectivity with a mobile phone carrier by offering a SMS gateway to send and receive messages and other digital content.

A SMS Gateway is used to send text messages with or without a mobile phone, and is used by aggregators to forward text messages to mobile phones.

Telephone Consumer Protection Act ("TCPA") of 1991 restricts the use of SMS text messages received by mobile phones, and SMS messages sent without a consumer's consent can violate the TCPA.

Transfer Control Protocol/Internet Protocol ("TCP/IP") is a protocol for moving files over the Internet.

Voice over Internet Protocol ("VoIP") relates to communications transmitted over the Internet such as SKYPE.

URL or Uniform Resource Locator is an address on the World Wide Web.

User Interface or UI is the junction between a user and a computer program. An interface is a set of commands or menus through which a user communicates with a program. A command driven interface is one in which the user enter commands. A menu-driven interface is one in which the user selects command choices from various menus displayed on the screen.

Web-Browser is a complex software program, resident in a client computer, that is capable of loading and displaying text and images and exhibiting behaviors as encoded in HTML (HyperText Markup Language) from the Internet, and also from the client computer's memory. Major browsers include MICROSOFT INTERNET EXPLORER, NETSCAPE, APPLE SAFARI, MOZILLA FIREFOX, and OPERA.

Web-Server is a computer able to simultaneously manage many Internet information-exchange processes at the same time. Normally, server computers are more powerful than client computers, and are administratively and/or geographically centralized. An interactive-form information-collection process generally is controlled from a server computer, to which the sponsor of the process has access.

Wireless Application Protocol ("WAP") is an open, global specification that empowers users with mobile wireless communication devices (such as mobile phones) to easily access data and to interact with Websites over the Internet through such mobile wireless communication device. WAP works with most wireless communication networks such as CDPD, CDMA, GSM, PDC, PHS, TDMA, FLEX, reflex, iDEN, TETRA, DECT, DataTAC, Mobitex and GRPS. WAP can be built on most operating systems including PalmOS, WINDOWS, CE, FLEXOS, OS/9, JavaOS and others.

WAP Push is defined as an encoded WAP content message delivered (pushed) to a mobile communication device which includes a link to a WAP address.

Gaming on mobile devices creates security issues. The prior art has failed to address these issues.

BRIEF SUMMARY OF THE INVENTION

The present invention allows for management of a virtual casino game whether the game logic resides on a mobile device or on a server.

The present invention is generally a system configured to give casino operators a way to host and manage mobile casino games for use by their players. The system is comprised of a player mobile device having mobile data communications capability, and is connected to the mobile data network. A native mobile application downloaded to the mobile device which has access to the GPS interface among others. A collection of application content representing the casino's virtual gaming floor, marketing, etc. The application content containing navigation to the virtual casino floor and descriptions of each of the available games. Each game description containing a button used to launch the mobile game. Once the game launch button is pressed, the native application queries the device GPS to collect the location information, then creates a secure connection to the game server and passes the location and player authentication information to the game server and requests the game be launched. In the process of launching the game, the game server queries the Network Operator on which the mobile device resides and receives the network's approximation on the geographical location of the mobile device. If the GPS and Network locations are equal within a predefined tolerance, the game server launches the game and begins play. The mobile game queries the game server for starting credits and limitations which results in the game server contacting the player's wager account to verify credit and wager and then displays the balance information and the game begins. Each wager is again tagged with a GPS location and authentication as it is sent down to the game server. The game server queries the Network location and confirms the GPS, checks the credit balance on the account, rules and limitations, and then executes the wager and returns the result to the game.

One aspect of the present invention is a method for secure play in a mobile virtual casino. The method includes opening a casino style game on a mobile device of a player. The casino style game application is segmented to have a game logic for the casino style game reside at a game server. The method also includes creating a secure connection between the mobile device and the game server over a network outside of the casino style game. The method also includes authenticating the location of the mobile device using a GPS component of the mobile device. The method also includes authenticating the player on the mobile device. The method also includes authenticating the player to the mobile device at the game server. The method also includes transmitting a user-interface of the casino style game from the game server to the mobile device over the network. The method also includes transmitting an action of the player and a wager from the mobile device to the game server. The method also includes confirming sufficient credit for the wager at a patron accounting database. The method also includes executing the wager and the associated game logic at the game server. The method also includes generating an outcome at the game server that is recorded in an account of the player at the database of the loyalty site. The method also includes returning the outcome from the game server to the mobile game component on the mobile device for presentation.

Another aspect of the present invention is a method for secure play in a mobile virtual casino. The method includes opening a casino style game on a mobile device of a player. The casino style game application is segmented to have a game logic for the casino style game reside at a game server. The method also includes creating a secure connection between the mobile device and the game server over a network outside of the casino style game. The method also includes authenticating a player, the location of the mobile device using a GPS component of the mobile device, and the player to the mobile device, outside of the casino style game. The method also includes executing a wager and an associated game logic by the player at the game server subsequent to confirming sufficient credit for the wager at a patron accounting database. The method also includes generating an outcome at the game server that is recorded in an account of the player at the database of the loyalty site. The method also includes returning the outcome from the game server to the mobile game component on the mobile device for presentation.

Yet another aspect of the present invention is a method for secure play in a mobile virtual casino. The method includes accessing a casino style game on a mobile device of a player. The casino style game application is segmented to have a game logic for the casino style game reside at a game server. The method also includes creating a secure connection between the mobile device and the game server over a network. The method also includes determining a location of the mobile device using a GPS component of the mobile device. The method also includes authenticating an identity of the player on the mobile device. The method also includes transmitting the identity of the player and the location of the mobile device from the mobile device to the game server. The method also includes transmitting a user-interface of the casino style game from the game server to the mobile device over the network. The method also includes packaging and transmitting an action of the player and a wager from the mobile device to the game server. The method also includes authenticating the player at the game server and confirming sufficient credit for the wager at a patron accounting database. The method also includes executing the wager and the associated game logic at the game server. The method also includes generating an outcome at the game server. The method also includes recording the outcome in an account of the player at the database of the loyalty site. The method also includes returning the outcome from the game server to the mobile game component on the mobile device for presentation.

Yet another aspect of the present invention is a system for secure play in a mobile virtual casino. The system includes at least one mobile communication device, a network, a patron accounting database, and a game server. The mobile device comprises a GPS component, a resident mobile application for a casino style game application and a mobile browser. The mobile device is configured to determine a location of the mobile device using a GPS component, authenticate an identity of the player, transmit the identity of the player and the location of the mobile device, and package and transmit an action of the player and a wager. The game server is in communication with the mobile communication device over the network. The casino style game application is segmented to have a game logic for the casino style game reside at the game server. The game server is configured to create a secure connection between the mobile device and the game server, transmit a user-interface of the casino style game, authenticate the player, and confirm sufficient credit for the wager at the patron accounting database, execute the wager and the associated game logic, generate an outcome, record the outcome in an account of the player at the patron accounting database, and return the outcome to the mobile game component on the mobile device for presentation.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
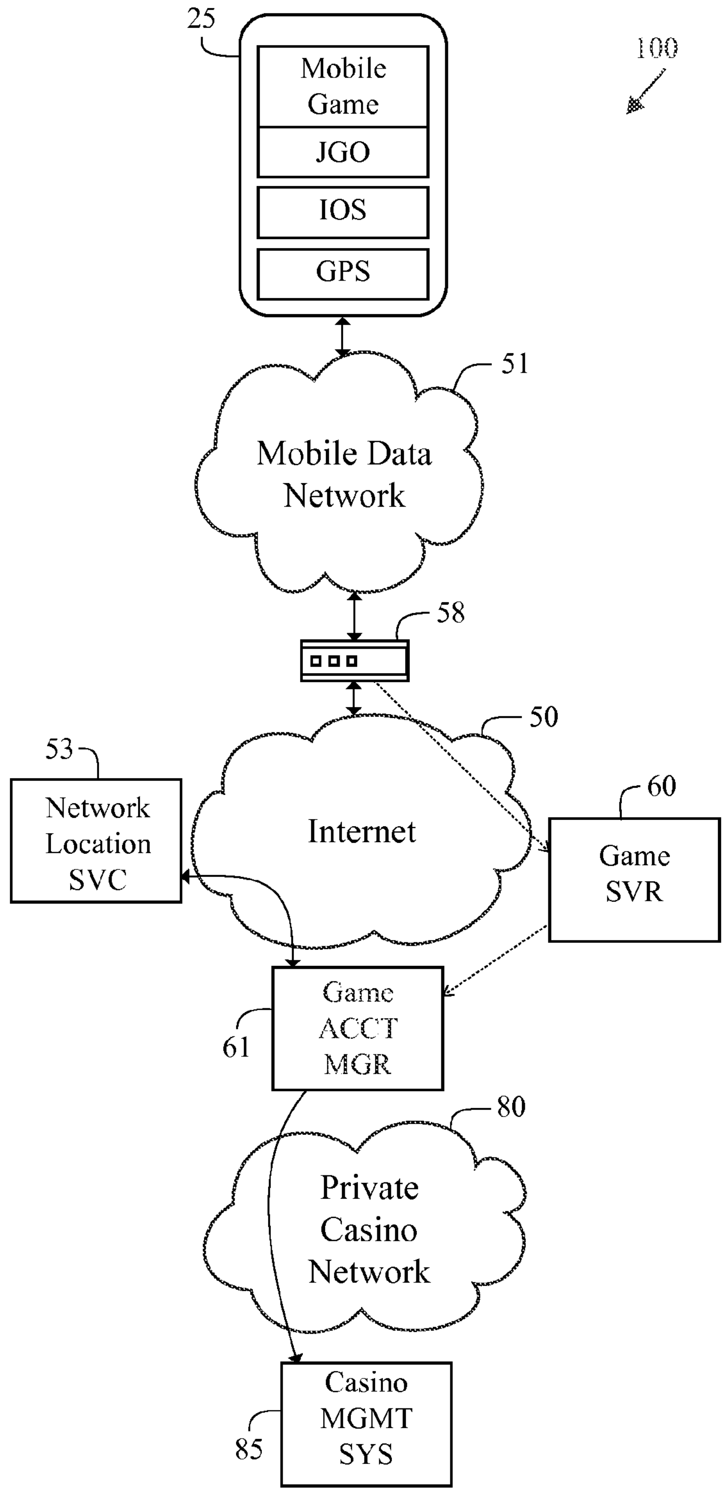
FIG. 1 is a block diagram of a system for secure play in a mobile virtual casino.

As shown in FIG. 1, a system for secure play in a mobile virtual casino is generally designated 100. A virtual casino on a native application on a mobile communication device 25 has various virtual casino games including but not limited to slots, craps, roulette, blackjack and others such as pai gow. The system 100 includes at least one mobile communication device 25, a network 51, a network location service 53, a game account manager 61, a game server 60, a private casino network and a casino management subsystem 85.

The mobile communication device 25 comprises a GPS component, a resident mobile application for a casino style game application and a mobile browser. The mobile communication device 25 is configured to determine a location of the mobile communication device 25 using a GPS component, authenticate an identity of the player, transmit the identity of the player and the location of the mobile communication device 25, and package and transmit an action of the player and a wager.

The game server 60 is in communication with the mobile communication device 25 over the mobile data network 51 and/or the Internet 50 through a router 58. The casino style game application is segmented to have a game logic for the casino style game reside at the game server 60. The game server 60 is configured to create a secure connection between the mobile communication device 25 and the game server 60, transmit a user-interface of the casino style game, authenticate the player, and confirm sufficient credit for the wager at a patron accounting database, execute the wager and the associated game logic, generate an outcome, record the outcome in an account of the player at the patron accounting database, and return the outcome to the mobile game component on the mobile communication device 25 for presentation.

The game server 60 also authenticates the location of the mobile communication device 25 using the network location service 53. The game server 60 queries the mobile data network 51 on which the mobile communication device 25 operates for the geographical location of the mobile communication device 25. The mobile data network 51, through the network location service 53, utilizes triangulation, nearest cell tower data, or the like to provide an approximate geographical location of the mobile communication device 25. The mobile data network 51 transmits the approximate geographical location of the mobile device 25 to game server 60. The game server 60 then determines if the geographical location provided by the native application 75 on the mobile communication device 25 is within a predefined boundary of the approximate geographical location of the mobile communication device 25 provided by the mobile data network 51. If the game server 60 determines that the geographical locations are within the predefined boundary, and if the location is within a permitted gambling jurisdiction, such as the State of Nevada, then the game server 60 launches the virtual casino game for the native application 75

Figure 2:
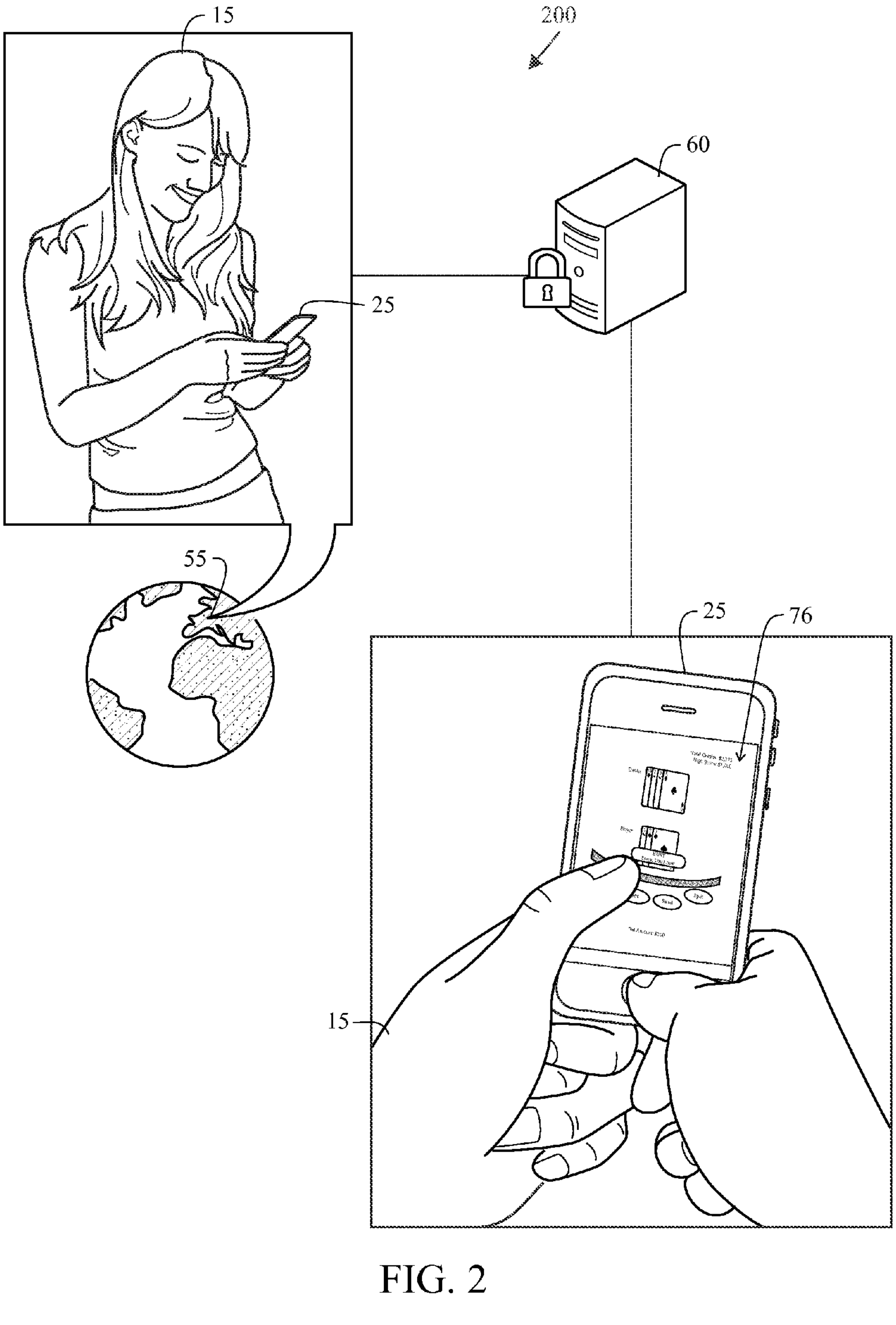
FIG. 2 is an illustration of a user accessing a mobile virtual casino on her mobile communication device.

As shown in FIG. 2, a patron 15 uses her mobile communication device 25 to participate in the system 200 for a managing a virtual casino game. The patron 15 launches an application 75 on her mobile communication device 25 to play a virtual casino game 76. The system 200 determines her location 55 to determine if she is within a jurisdiction that permits online gaming.

The mobile communication devices (host devices) utilized with the present invention preferably include mobile phones, smartphones, tablet computers, PDAs and the like. Examples of smartphones include the IPHONE® smartphone from Apple, Inc., BLACKBERRY® smartphones from Research In Motion, the DROID® smartphone from Motorola Mobility Inc., and many more. Examples of tablet computing devices include the IPAD® tablet from Apple Inc., and the XOOM™ tablet from Motorola Mobility Inc.

Figure 3:
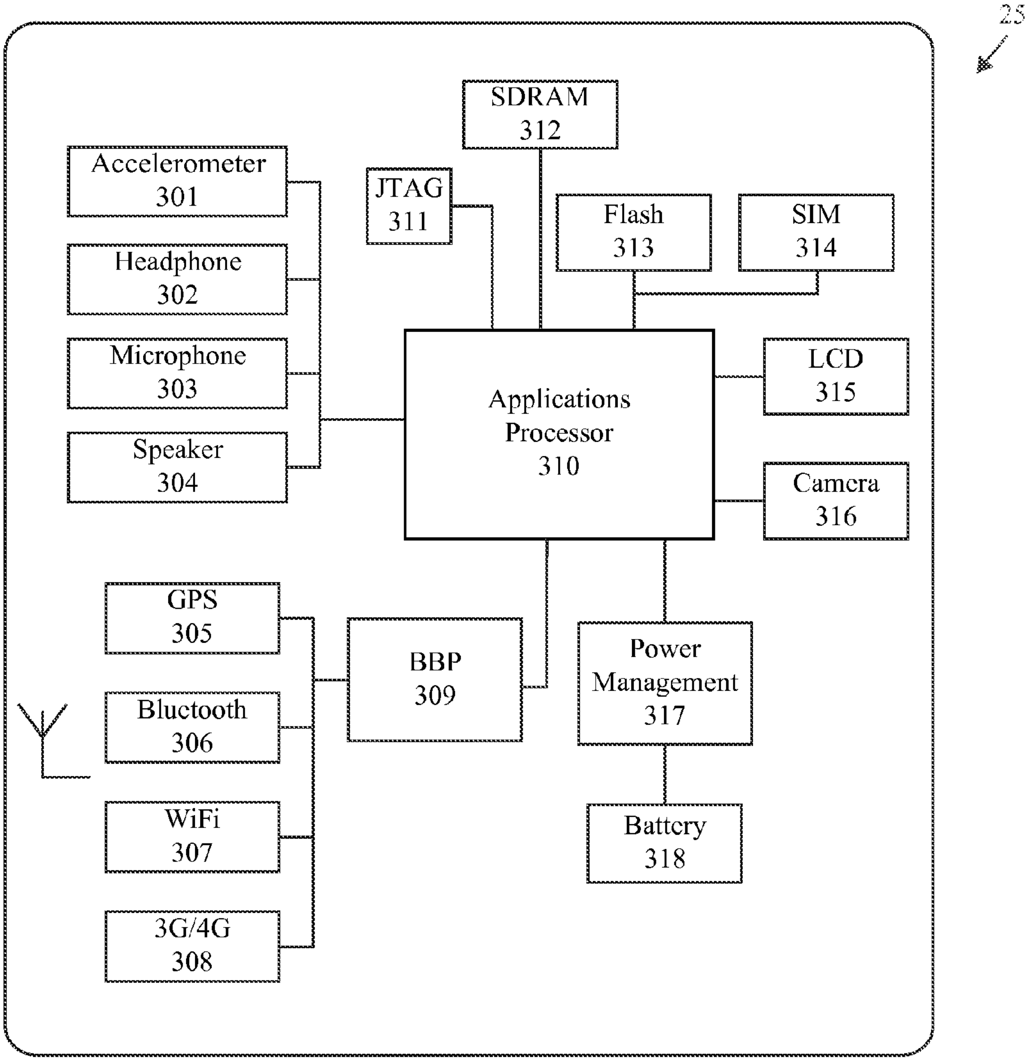
FIG. 3 is a block diagram of components of a mobile communication device.

As shown in FIG. 3, a typical mobile communication device includes an accelerometer 301, a head phone 302, a microphone 303, a speak 304, a GPS chipset 305, a Bluetooth component 306, a WiFi component 307, a 3G/4G component 308, a BaseBand Processor (for radio control) 309, an applications processor 310, a JTAG (debugger) 311, a SDRAM memory 312, a Flash memory 313, SIM card 314, LCD display 315, a camera 316, a power management circuit 317 and a battery or power source 318.

Each of the interface descriptions preferably discloses use of at least one communication protocol to establish handshaking or bi-directional communications. These protocols preferably include but are not limited to XML, HTTP, TCP/IP, Serial, UDP, FTP, Web Services, WAP, SMTP, SMPP, DTS, Stored Procedures, Import/Export, Global Positioning Triangulation, IM, SMS, MMS, GPRS and Flash. The databases used with the system preferably include but are not limited to MSSQL, Access, MySQL, Progress, Oracle, DB2, Open Source DBs and others. Operating system used with the system preferably include Microsoft 2010, XP, Vista, 200o Server, 2003 Server, 2008 Server, Windows Mobile, Linux, Android, Unix, I series, AS 400 and Apple OS.

The underlying protocol at a server, is preferably Internet Protocol Suite (Transfer Control Protocol/Internet Protocol ("TCP/IP")), and the transmission protocol to receive a file is preferably a file transfer protocol ("FTP"), Hypertext Transfer Protocol ("HTTP"), Secure Hypertext Transfer Protocol ("HTTPS") or other similar protocols. The transmission protocol ranges from SIP to MGCP to FTP and beyond. The protocol at the server is preferably HTTPS.

A mobile communication service provider (aka phone carrier) of the customer such as VERIZON, AT&T, SPRINT, T-MOBILE, and the like mobile communication service providers, provide the communication network for communication to the data capable communication device of the customer. An example of a mobile phone location software/service is WAVEMARKET.

Figure 4:
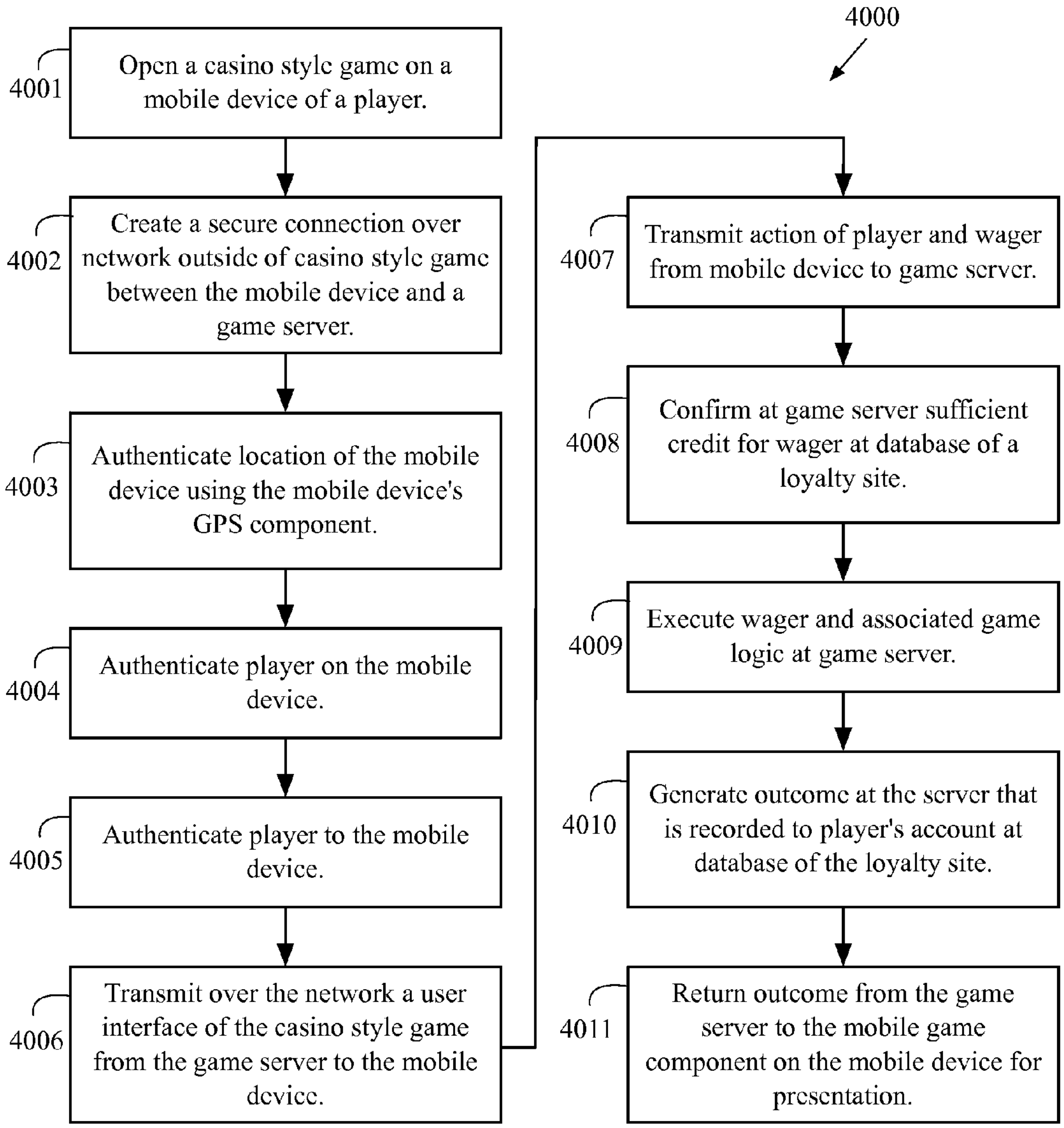
FIG. 4 is a flow chart for a method for secure play in a mobile virtual casino.

A flow chart of a method for managing a virtual casino game is shown in FIG. 4. The method 4000 begins at block 4001 with launching a native application on a mobile device for virtual casino game. The virtual casino game is one of a plurality of virtual casino games on the native mobile application. Each of the plurality of virtual casino games comprises a button to launch the virtual casino game. At block 4002, a secure connection is created over a network between the mobile communication device and a game server. At block 4003, a GPS location for the mobile communication device is authenticated by the GPS component of the mobile device. At block 4004, an identity of the player on the mobile communication device is authenticated. At block 4005, an identity of the player is authenticated to the mobile communication device. At block 4006, a user-interface of the mobile game is transmitted from the game server to the mobile communications device over the network. At block 4007, an action of the player and a wager is packaged and transmitted from the mobile device to the game server. At block 4008, sufficient credit for the wager at a database of a loyalty site is confirmed by the game server. At block 4009, the wager and associated game logic is executed at a game server. At block 4010, an outcome is generated. At block 4011, the outcome is returned to the device.

Figure 5:
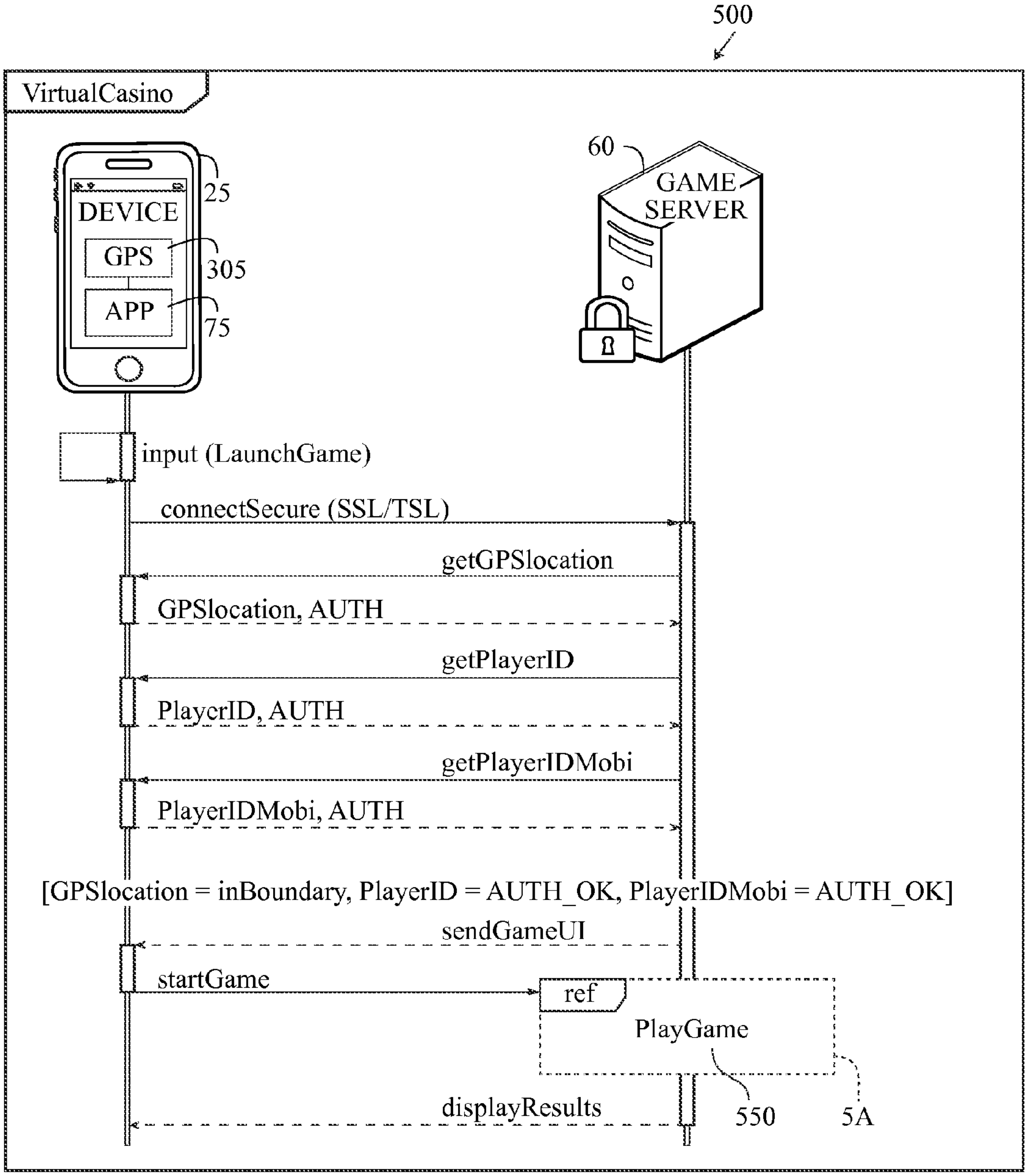
FIG. 5 is a sequence diagram of communications within a system for secure play in a mobile virtual casino.
Figure 5A:
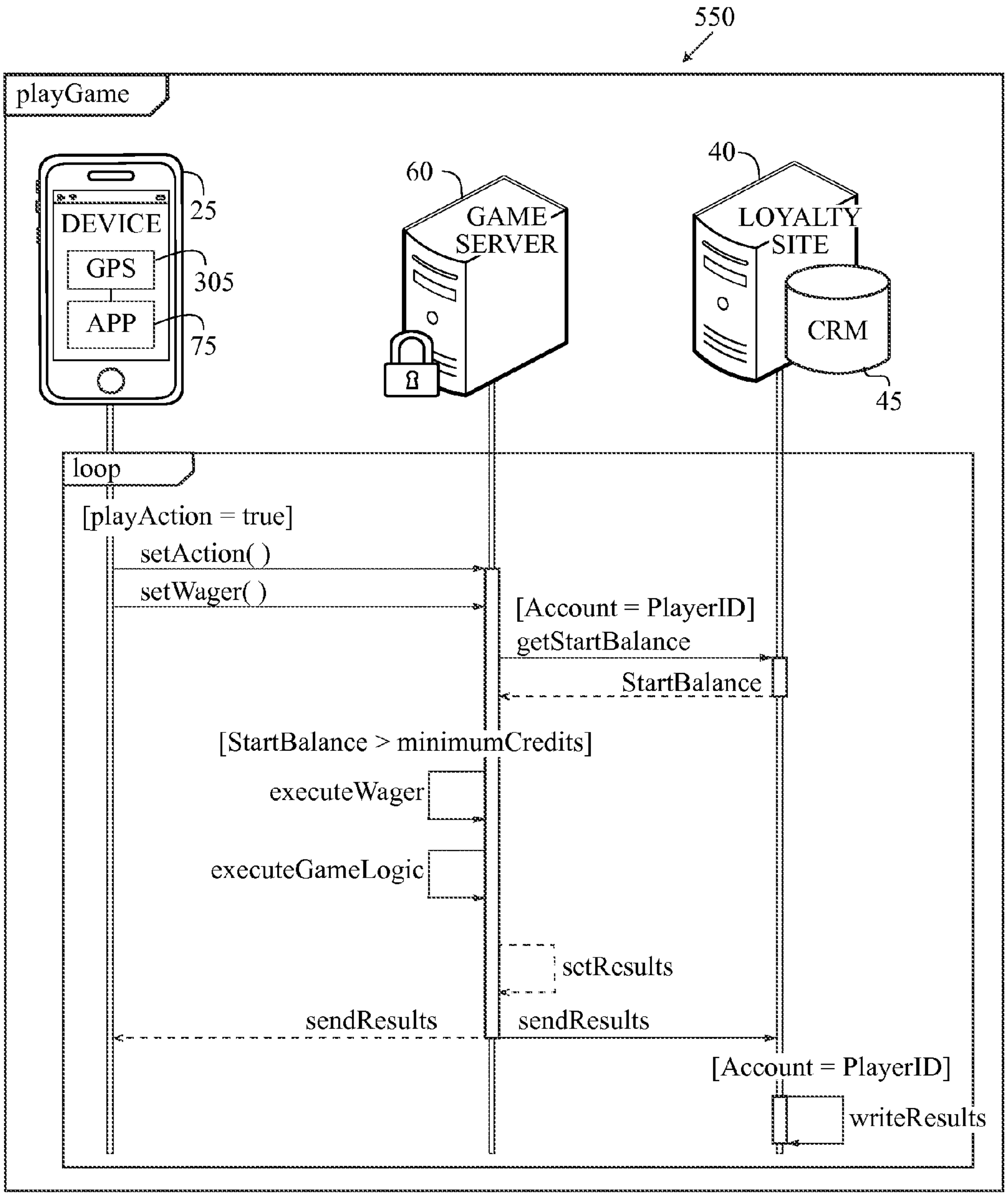
FIG. 5A is a sequence diagram of communications within a system for secure play in a mobile virtual casino.

As shown in FIGS. 5 and 5A, sequence diagrams for managing a virtual casino game illustrate the communications for authenticating a location of a mobile communication device 25 and confirming credits are performed by the game server 60 in communication with the communications network, the mobile communication device 25 and the player account database 45 at a loyalty server 40.

An end user 15 launches a native application 75 on a mobile communication device 25 for virtual casino game. The virtual casino game is one of a multiple virtual casino games on the native mobile application 76. Each of the virtual casino games preferably comprises a button to launch the virtual casino game. A secure connection is created over a network between the mobile communication device 25 and a game server 60, preferably using a cryptographic protocol such as SSL (secure sockets layer) or TLS (transport layer security). The game server 60 then requests a GPS location from the mobile communication device 25. A GPS location for the mobile communication device is authenticated by a GPS component 305 of the mobile communication device 25 and sent to the game server 60. The game server 60 then requests a player identification from the mobile communication device 25. An identity of the player is authenticated on the mobile communication device and sent to the game server 60. The game server 60 then requests a player mobile identification from the mobile communication device 25. A player mobile identification is authenticated on the mobile communication device 25 and sent to the game server 60. The game server 60 then determines if the location is within an online gaming jurisdiction, and if the player has sufficient credits in a loyalty account. The game server 60 then transmits a user-interface of the mobile game to the mobile communications device 25 over the network. In playing the game, as shown in FIG. 5A, an action of the player and a wager is packaged and transmitted from the mobile communication device 25 to the game server 60. The game server 60 confirms if there is sufficient credit for the wager at a CRM database 45 of a loyalty site 40. The wager and associated game logic is executed at a game server 60, in order to prevent fraud. An outcome is generated and returned to the mobile communication device 25 and recorded at the CRM database 45 of the loyalty site 40.

Figure 6:
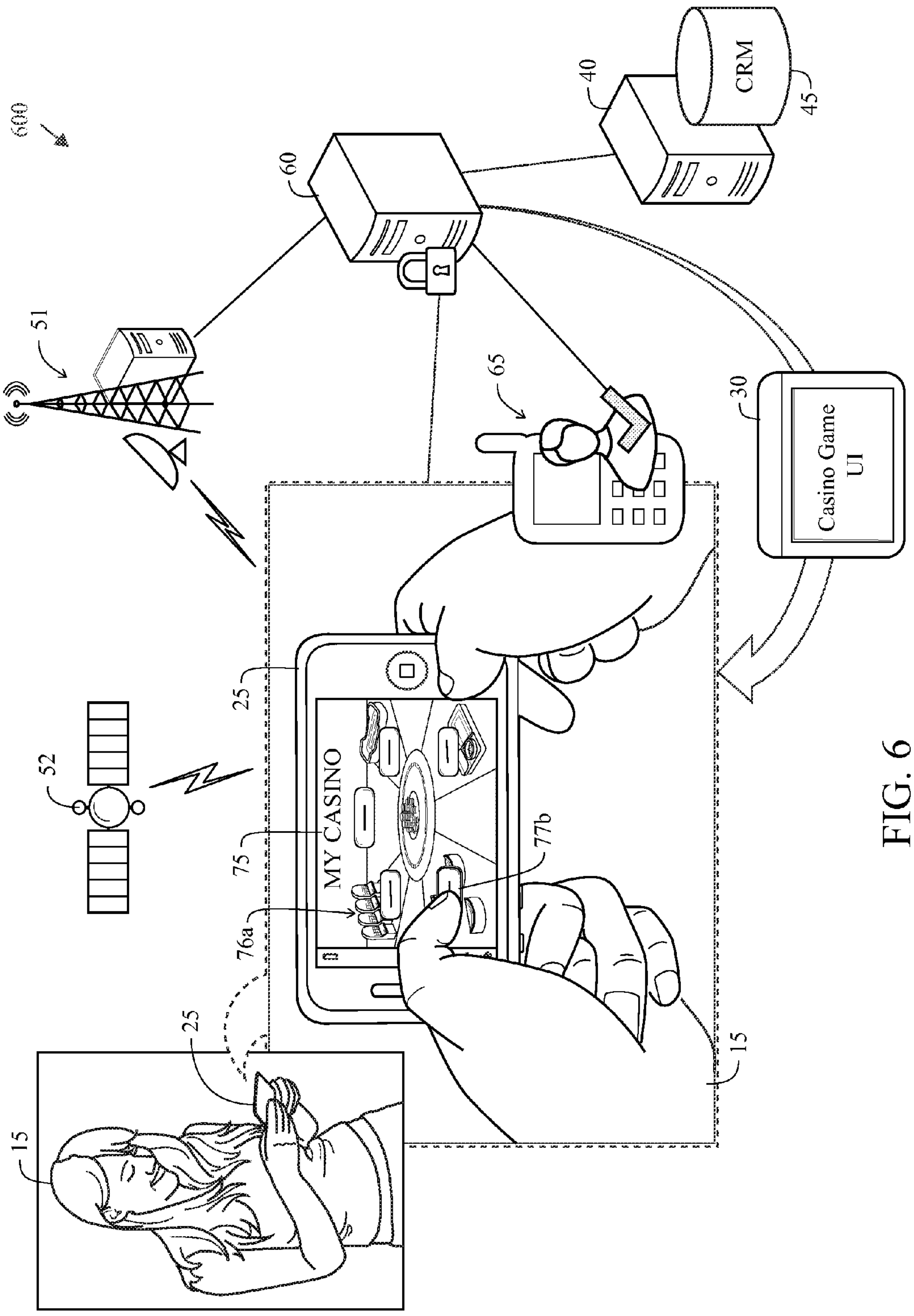
FIG. 6 is a block diagram of a system for secure play in a mobile virtual casino.

A system 600 for managing a virtual casino game is shown in FIG. 6. The system 600 provides for secure online gaming since a user interface 30 is segmented from the game 76 and secure on a game server 60, which prevents tampering and fraud. Further, since the game logic is secure on the game server 60, auditing of the results is secure. As mentioned above, an end user 15 launches a native application 75 on a mobile communication device 25 for virtual casino game. The virtual casino game is one of a multiple virtual casino games on the native mobile application 76, which can be accessed through a touch screen button 77. Each of the virtual casino games preferably comprises a button 77 to launch the virtual casino game. A secure connection is created over a network between the mobile communication device 25 and a game server 60, preferably using a cryptographic protocol such as SSL (secure sockets layer) or TLS (transport layer security).

The game server 60 then requests a GPS location from the mobile communication device 25 utilizing a GPS component of the mobile communication device which receives signals from GPS satellites 52. A GPS location for the mobile communication device is authenticated by a GPS component 305 of the mobile communication device 25 and sent to the game server 60. The game server also authenticates the location. The game server 60 then requests a player identification from the mobile communication device 25. An identity of the player is authenticated 65 on the mobile communication device and sent to the game server 60. The game server 60 queries the mobile data network 51 on which the mobile communication device 25 operates for the geographical location of the mobile communication device 25. The mobile data network 51, through the network location service 53, utilizes triangulation, nearest cell tower data, or the like to provide an approximate geographical location of the mobile communication device 25. The mobile data network 51 transmits the approximate geographical location of the mobile device 25 to game server 60. The game server 60 then determines if the geographical location provided by the native application 75 on the mobile communication device 25 is within a predefined boundary of the approximate geographical location of the mobile communication device 25 provided by the mobile data network 51.

The game server 60 then determines if the location is within an online gaming jurisdiction, and if the player has sufficient credits in a loyalty account. The game server 60 then transmits a user-interface of the mobile game to the mobile communications device 25 over the network. By maintaining the game logic on the server 60, the virtual casino is managed by the loyalty site 40 preventing fraud and allowing for proper audits of the results. Thus, the end user 15 sends transmissions from the mobile communication device 25 to the game server in order to play the game, which is conducted on the game server 60, not the mobile communication device 25. Although it appears to the end user that the casino game 76 of the virtual casino application resident on the mobile communication device 25 allows the casino game 76 to be played on the mobile communication device 25, the game logic of the casino game 76 is run at the game server 60.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

I claim as my invention:

1. A method for secure play in a mobile virtual casino, the method comprising:

opening a casino style game application on a mobile device of a player, the casino style game application segmented to have a game logic for the casino style game reside at a game server, wherein the casino style game application is a downloaded native application residing in a memory of the mobile device;

creating a secure connection between the casino style game application of the mobile device and the game server over a communications network outside of the casino style game;

requesting at a game account manager a location authentication of mobile device;

authenticating the location of the mobile device using a GPS component of the mobile device and transmitting GPS location of the mobile device to the game server on the secure connection over the communications network and forwarding the location to the game account manager;

requesting from the game account manager to a communications network operator for the mobile device a geographical location for the mobile device utilizing cell tower triangulation or nearest cell tower data to determine the geographical location;

authenticating the player on the casino style game application of the mobile device;

transmitting the authentication of the player from the casino style game application of the mobile device to the game server on the secure connection over the communications network and forwarding the location to the game account manager;

verifying at the game account manager the location of the mobile device based on the geographical location and the GPS location;

transmitting a user-interface of the casino style game from the game server to the casino style game application of the mobile device over the communications network;

transmitting an action of the player and a wager from the casino style game application of the mobile device to the game server on the secure connection over the communications network;

confirming at the game account manager sufficient credit for the wager at a patron accounting database, wherein the patron accounting database is hosted at a loyalty site;

executing the wager and the associated game logic at the game server;

generating an outcome at the game server that is recorded in accounting database; and returning the outcome from the game server to the casino style game application of the mobile device for presentation.

2. The method according to claim 1 wherein the mobile device is a mobile phone or tablet computer.

3. The method according to claim 1 wherein the casino style game is selected from the group consisting of blackjack, slots, poker, pai gow, and craps.

4. A system for secure play in a mobile virtual casino, the system comprising:

at least one mobile device comprising a GPS component, and a resident downloaded native mobile application for a casino style game application, wherein the casino style game application of the mobile device is configured to determine a GPS location of the mobile device using a GPS component, authenticate an identity of the player, transmit the identity of the player and the GPS location of the mobile device, and package and transmit an action of the player and a wager;

a network;

a patron accounting database;

a game account manager; and a game server in communication with the mobile device over the network, wherein the casino style game application is segmented to have a game logic for the casino style game reside at the game server, the game server configured to create a secure connection between the casino style game application of the mobile device and the game server, the game account manager configured to request from a communications network operator for the mobile device a geographical location for the mobile device utilizing cell tower triangulation or nearest cell tower data to determine the geographical location, the game account manager configured to verify the location of the mobile device based on the geographical location and the GPS location, the game server configured to transmit a user-interface of the casino style game, the game account manager configured to authenticate the player, the game account manager configured to confirm sufficient credit for the wager at the patron accounting database, the game server configured to execute the wager and the associated game logic, the game server configured to generate an outcome, the game account manager configured to record the outcome in an account of the player at the patron accounting database, and the game server configured to return the outcome to the casino style game application of the mobile device for presentation.

5. The system according to claim 4 wherein the mobile device is a mobile phone or tablet computer.

6. The system according to claim 4 wherein the casino style game is selected from the group consisting of blackjack, slots, poker, pai gow, and craps.

7. The system according to claim 4 wherein the patron accounting database is hosted at loyalty site.

* * * * *